(12) United States Patent
Seitter et al.

(10) Patent No.: US 11,035,106 B2
(45) Date of Patent: Jun. 15, 2021

(54) MIXING HYDRANT

(71) Applicant: Prier Products, Inc., Grandview, MO (US)

(72) Inventors: William C. Seitter, Overland Park, KS (US); Scott P. Brady, Lake Winnebago, MO (US); Joseph E. Poskin, Prairie Village, KS (US)

(73) Assignee: Prier Products, Inc., Grandview, MO (US)

(*) Notice: Subject to any disclaimer, the term of this patent is extended or adjusted under 35 U.S.C. 154(b) by 248 days.

(21) Appl. No.: 16/384,380

(22) Filed: Apr. 15, 2019

(65) Prior Publication Data

US 2020/0325662 A1 Oct. 15, 2020

(51) Int. Cl.
| | | |
|---|---|---|
| *E03B 9/02* | (2006.01) | |
| *E03B 7/12* | (2006.01) | |
| *E03C 1/10* | (2006.01) | |
| *F16K 47/14* | (2006.01) | |
| *E03C 1/08* | (2006.01) | |

(52) U.S. Cl.
CPC ............... *E03B 9/027* (2013.01); *E03B 7/12* (2013.01); *E03B 9/025* (2013.01); *E03C 1/08* (2013.01); *E03C 1/10* (2013.01); *F16K 47/14* (2013.01); *Y10T 137/3149* (2015.04); *Y10T 137/3185* (2015.04); *Y10T 137/3258* (2015.04); *Y10T 137/3294* (2015.04); *Y10T 137/7897* (2015.04)

(58) Field of Classification Search
CPC . E03B 9/027; E03B 9/025; E03B 7/12; E03B 1/08; F16K 47/14; Y10T 137/3149; Y10T 137/3185; Y10T 137/3258; Y10T 137/3294; Y10T 137/7897
See application file for complete search history.

(56) References Cited

U.S. PATENT DOCUMENTS

| | | | |
|---|---|---|---|
| 3,138,173 A | 6/1964 | Hartman | |
| 3,424,189 A * | 1/1969 | Woodford | ............... E03B 9/025 137/218 |
| 3,929,150 A | 12/1975 | Flinner et al. | |
| 3,952,770 A * | 4/1976 | Botnick | ................... E03B 9/025 137/360 |
| 4,644,970 A | 2/1987 | Lowry | |
| 4,673,000 A | 6/1987 | Haerr et al. | |
| 4,821,762 A * | 4/1989 | Breneman | ................. E03B 7/10 137/218 |

(Continued)

*Primary Examiner* — Matthew W Jellett
*Assistant Examiner* — Christopher D Ballman
(74) *Attorney, Agent, or Firm* — Erickson Kernell IP, LLC (57) ABSTRACT

A fully serviceable frost proof mixing hydrant for supplying water at various temperatures to the exterior of a building. The mixing hydrant includes hot and cold water inlets and a chamber in which the water is mixed based on the position of a cammed wheel acting on a pair of poppets. These poppets act as temperature regulators and check valves to prevent cross-flow leakage and/or contamination. The mixing hydrant includes an inside tube or flow sleeve for delivery of water to an outside body tube in communication with a spout on the head of the hydrant. The flow from the inside tube to the outside body tube reduces turbulence and provides a better outlet flow from the spout. Flow control and temperature control are independent allowing the user to set the flow as desired then adjust the temperature as desired without affecting the flow.

22 Claims, 11 Drawing Sheets

(56) References Cited

U.S. PATENT DOCUMENTS

| | | | |
|---|---|---|---|
| 5,158,105 A * | 10/1992 | Conway | E03B 7/10 |
| | | | 137/296 |
| 5,275,195 A | 1/1994 | Breda | |
| 5,340,018 A | 8/1994 | MacDonald | |
| 5,740,831 A * | 4/1998 | DeNardo | E03B 7/10 |
| | | | 137/218 |
| 5,752,542 A | 5/1998 | Hoeptner, III | |
| 5,884,661 A | 3/1999 | Plyler et al. | |
| 6,386,223 B1 | 5/2002 | Hoeptner, III | |
| 6,769,446 B1 | 8/2004 | Ball et al. | |
| 6,805,154 B1 * | 10/2004 | Dickey | E03B 7/10 |
| | | | 137/218 |
| 6,988,669 B2 * | 1/2006 | Nember | G05D 23/1353 |
| | | | 236/12.2 |
| 7,533,686 B2 | 5/2009 | Brattoli et al. | |
| 7,896,024 B2 | 3/2011 | Korb et al. | |
| 8,613,290 B1 * | 12/2013 | Wu | E03B 9/027 |
| | | | 137/218 |
| 8,707,982 B2 * | 4/2014 | Wu | E03B 9/027 |
| | | | 137/301 |
| 9,540,797 B2 * | 1/2017 | Wu | E03B 7/12 |
| 9,856,633 B1 * | 1/2018 | Wu | F16K 11/074 |
| 2010/0229961 A1 * | 9/2010 | Ball | E03B 7/10 |
| | | | 137/299 |
| 2013/0247995 A1 * | 9/2013 | Ehrlich | F16K 47/14 |
| | | | 137/1 |
| 2018/0202133 A1 * | 7/2018 | Walcome | F16K 15/026 |

* cited by examiner

MIXING HYDRANT

FIELD

The present invention generally relates to water hydrants, and more particularly, to a fully serviceable frost proof hydrant for supplying water at various temperatures to the exterior of a building.

BACKGROUND

Hydrants, also known as sillcocks, hose bibbs, spigots, freezeless hydrants, faucets and water fixtures, are known in the art. Hydrants are used to supply water to the outside of a building. In cold environments, hydrants with a shut-off extending into the warmer interior of the building are used. Under freezing conditions, should water trapped in the hydrant freeze as it solidifies and expands, the hydrant may burst or leak causing water damage to the interior of the building. Typically, hydrants and sillcocks are installed with a downward pitch so that the water drains when in the off position. If the prior art hydrant is not properly installed, water may be trapped in the hydrant and present a freeze and burst risk.

Some prior art hydrants provide both hot and cold outlets which may be separate or combined. A problem with these dual hydrants is that the water temperature is typically independently controlled and is dictated by the water flow from the hot and cold valves.

Another problem with prior art hydrants and sillcocks is the vacuum breaker often leaks during normal use of the hydrant constantly discharging water through the vacuum breaker onto the ground, floor or other surface below the hydrant resulting in a waste of water, an unsafe wet surface, damage to the surface, or simply an irritant for the user, for example.

SUMMARY

Embodiments of the invention are defined by the claims below, not this summary. A high-level overview of various aspects of the invention is provided here to introduce a selection of concepts that are further described in the Detailed Description section below. This summary is not intended to identify key features or essential features of the claimed subject matter, nor is it intended to be used in isolation to determine the scope of the claimed subject matter.

The present invention is directed to a fully serviceable frost proof hydrant for supplying water at various temperatures to the exterior of a building. The mixing hydrant includes hot and cold water inlets and a chamber in which the water is mixed based on the position of a cammed wheel acting on a pair of poppets. These poppets act as temperature regulators and check valves to prevent cross-flow leakage and/or contamination. The mixing hydrant includes an inside tube or flow sleeve for delivery of water to an outside body tube in communication with a spout on the head of the hydrant. The flow from the inside tube to the outside body tube reduces turbulence and provides a better outlet flow from the spout. Flow control and temperature control are independent allowing the user to set the flow as desired then adjust the temperature as desired without affecting the flow. A turbulence reducer integrated in the vacuum breaker prevents leakage during use of the hydrant by reducing turbulence acting on the vacuum breaker poppet. Additionally, the user is able to service all aspects of the hydrant from outside the building.

Other advantages of the present invention will become apparent from the following description taken in connection with the accompanying drawings, wherein is set forth by way of illustration and example, an embodiment of the present invention.

BRIEF DESCRIPTION OF THE DRAWINGS

FIG. 2a is an enlarged partial sectional perspective view of the mixing hydrant of FIG. 1 along line 2a-2a.

FIG. 4a is partial sectional view the hydrant of FIG. 3 along line 4a-4a.

DETAILED DESCRIPTION

Figure 1:
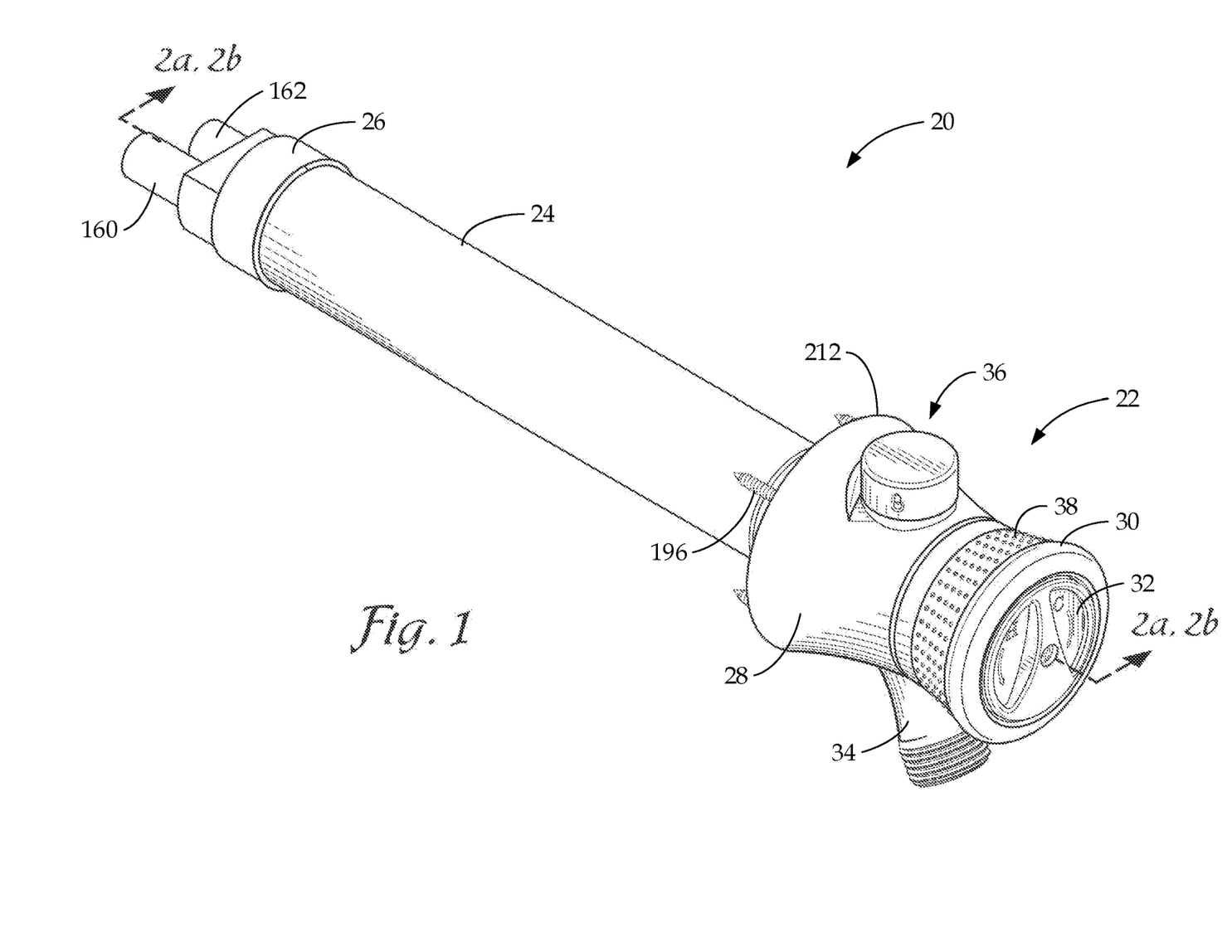
FIG. 1 is a perspective view of a mixing hydrant of the present invention.
Figure 2A:
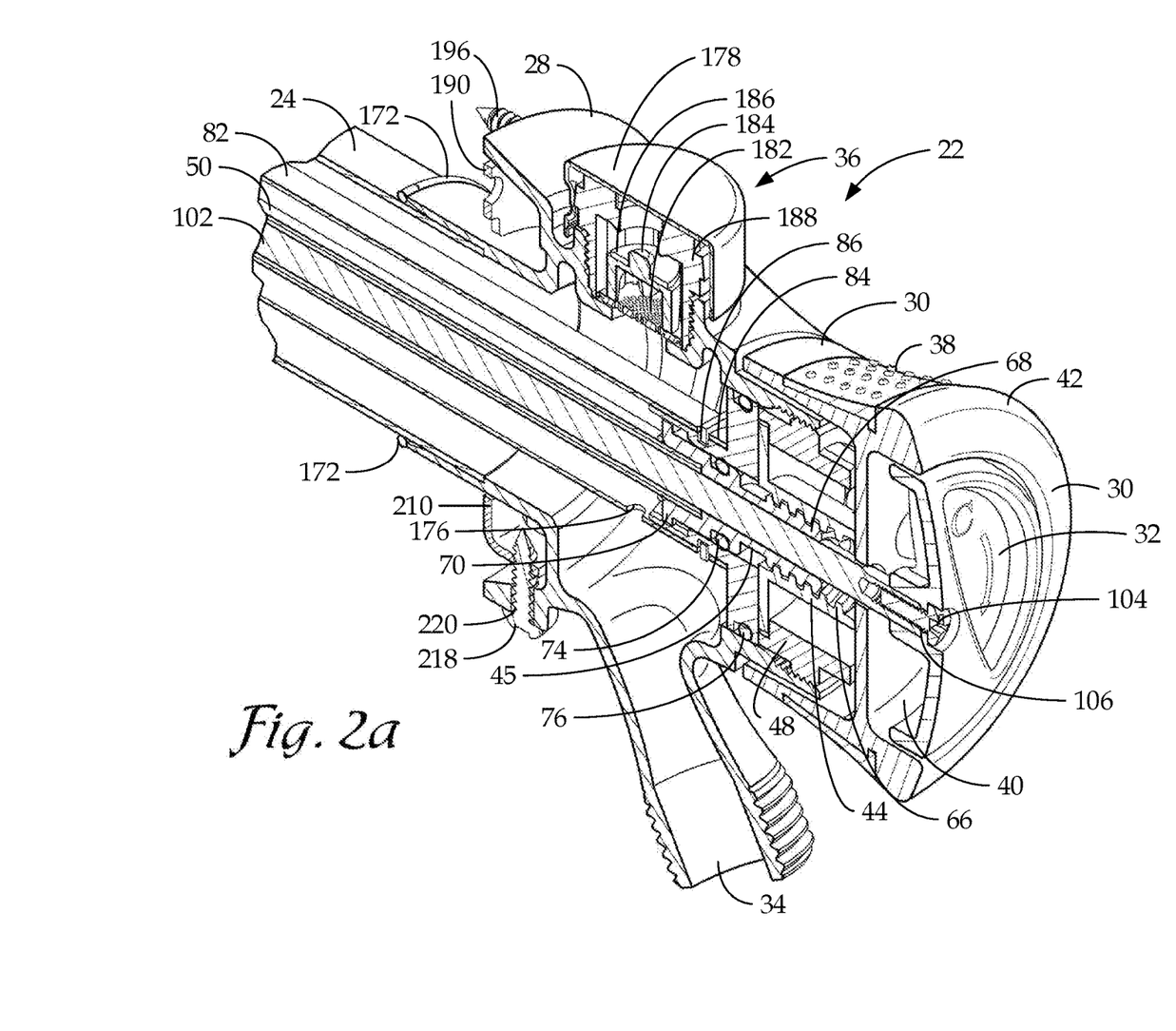
Figure 2B:
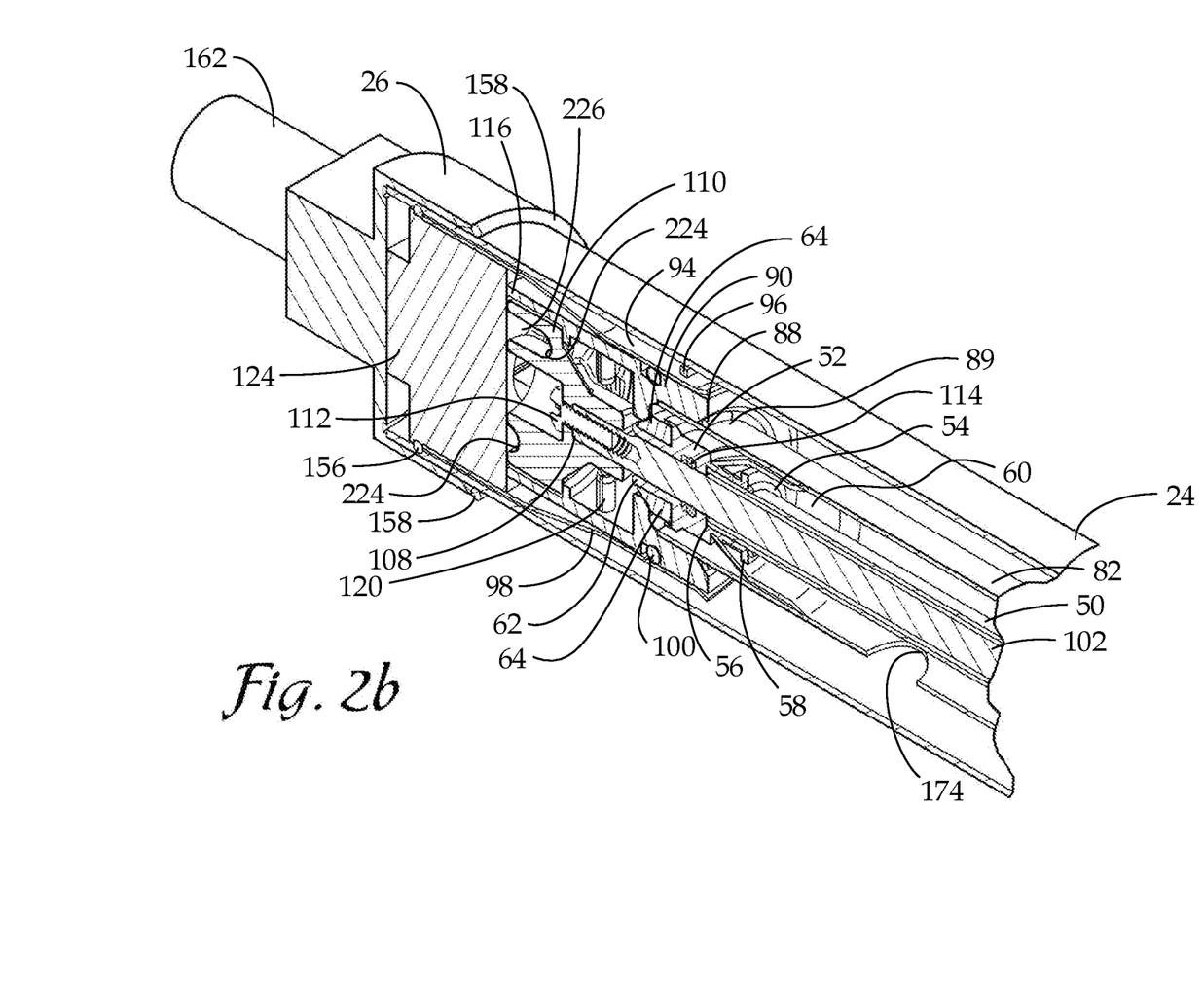
FIG. 2b is an enlarged partial sectional perspective view of the mixing hydrant of FIG. 1 along line 2b-2b.
Figure 3:
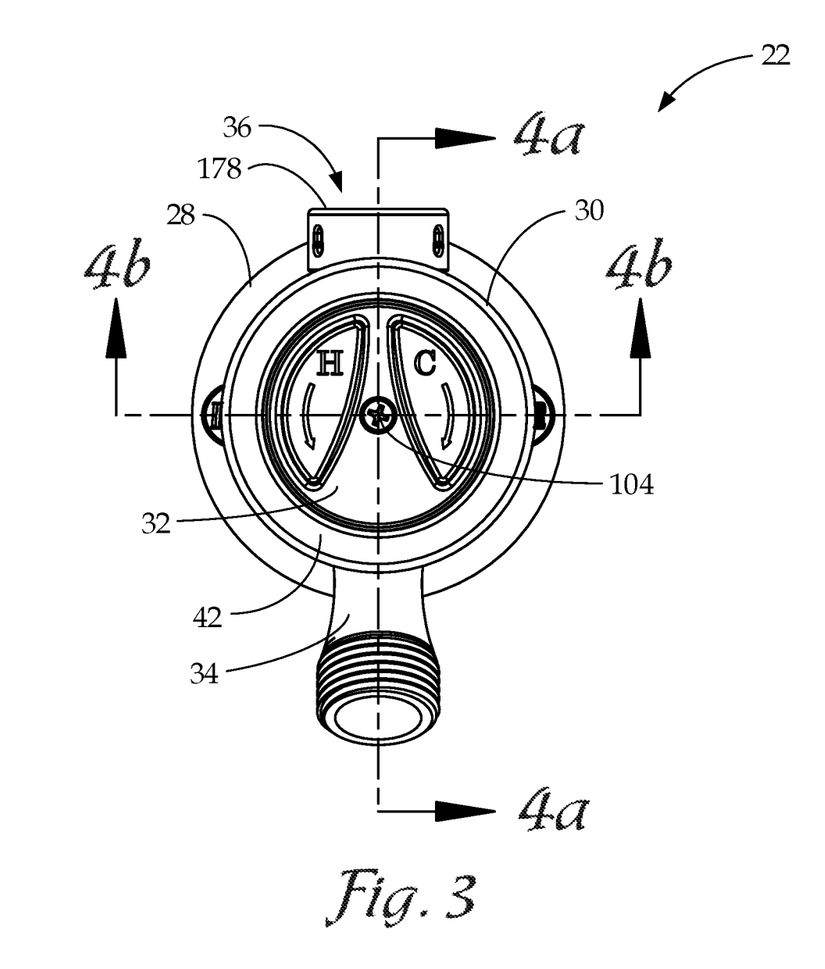
FIG. 3 is a front-end view of the mixing hydrant of FIG. 1.
Figure 4A:
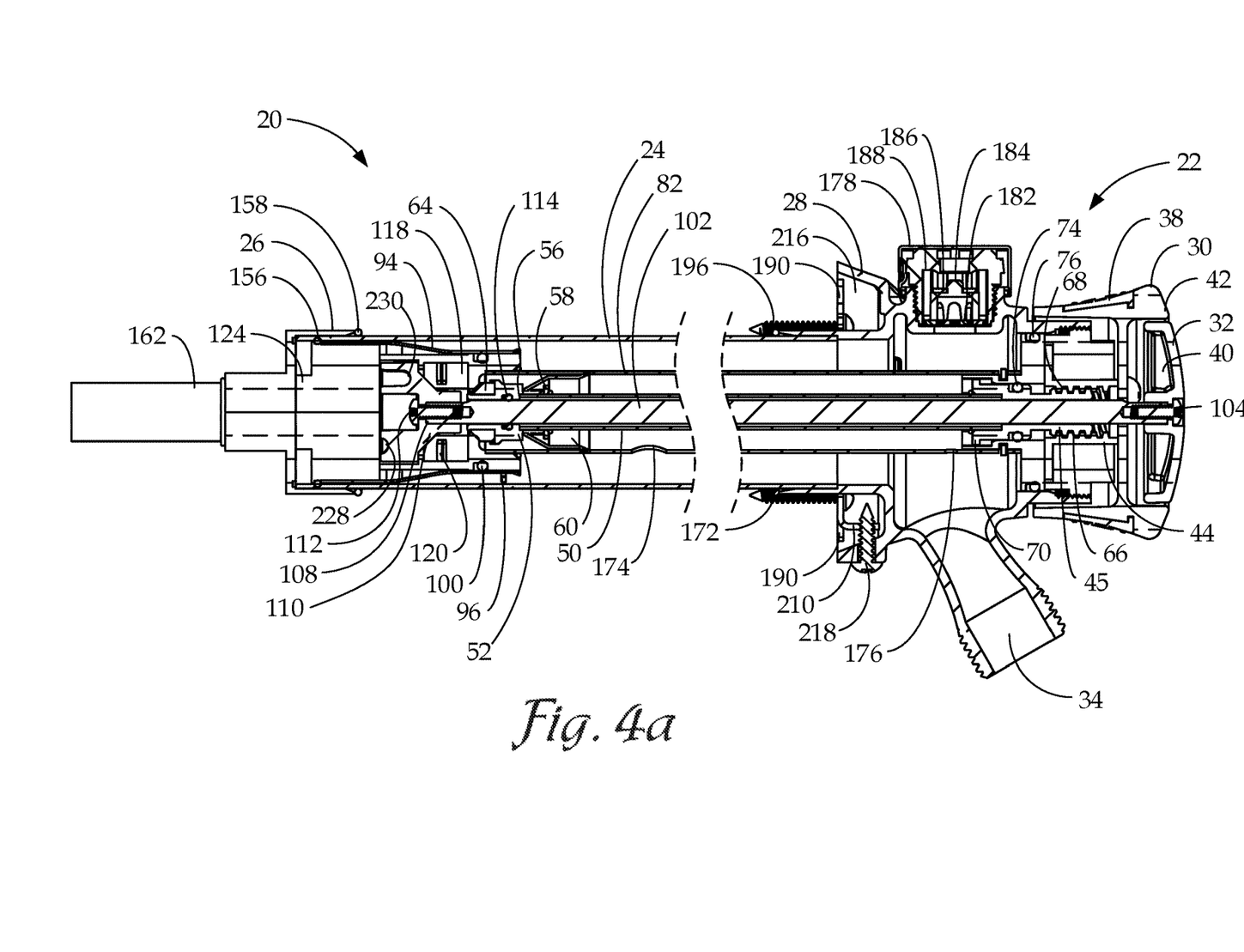
Figure 4B:
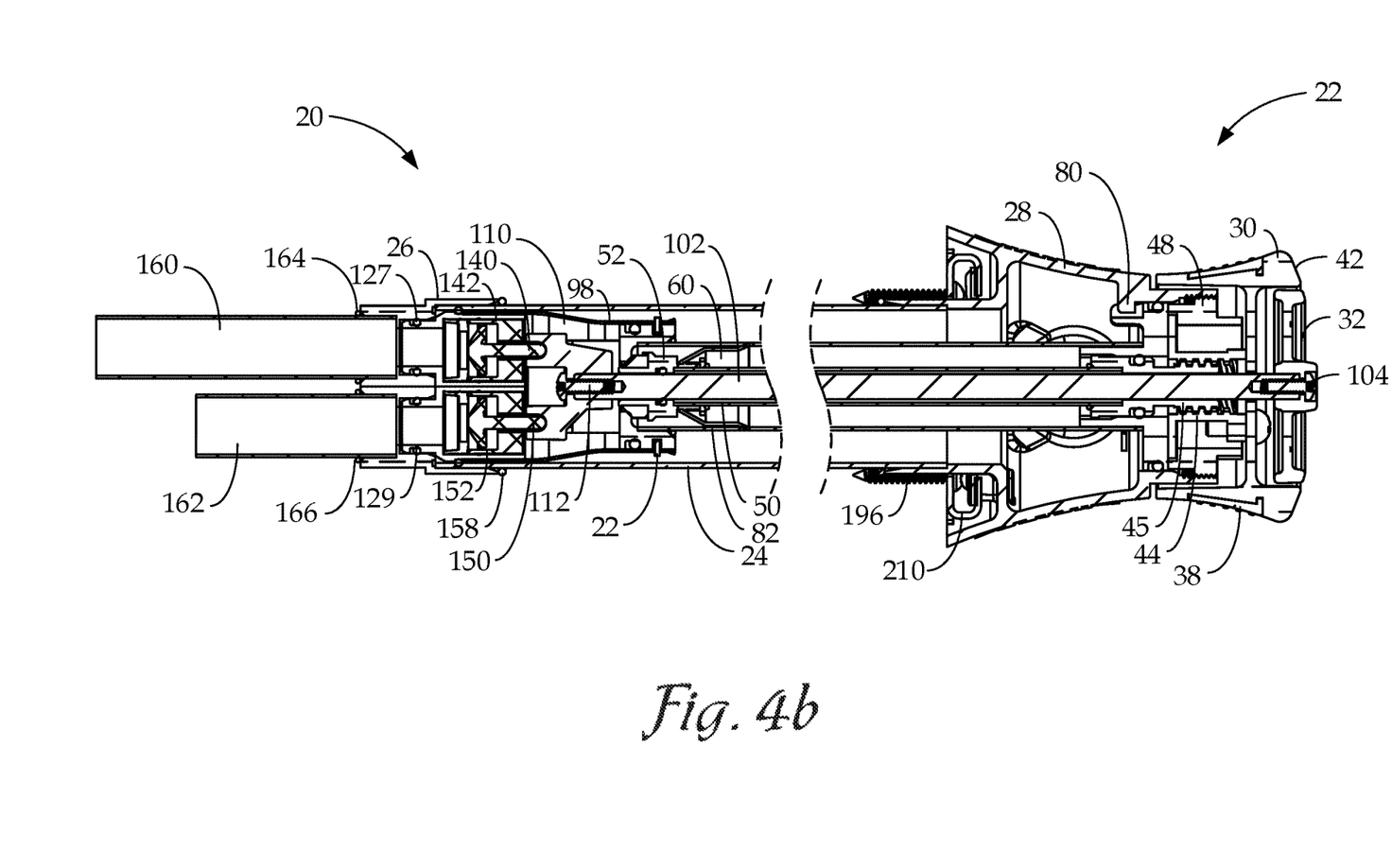
FIG. 4b is partial sectional view the hydrant of FIG. 3 along line 4b-4b.
Figure 5:
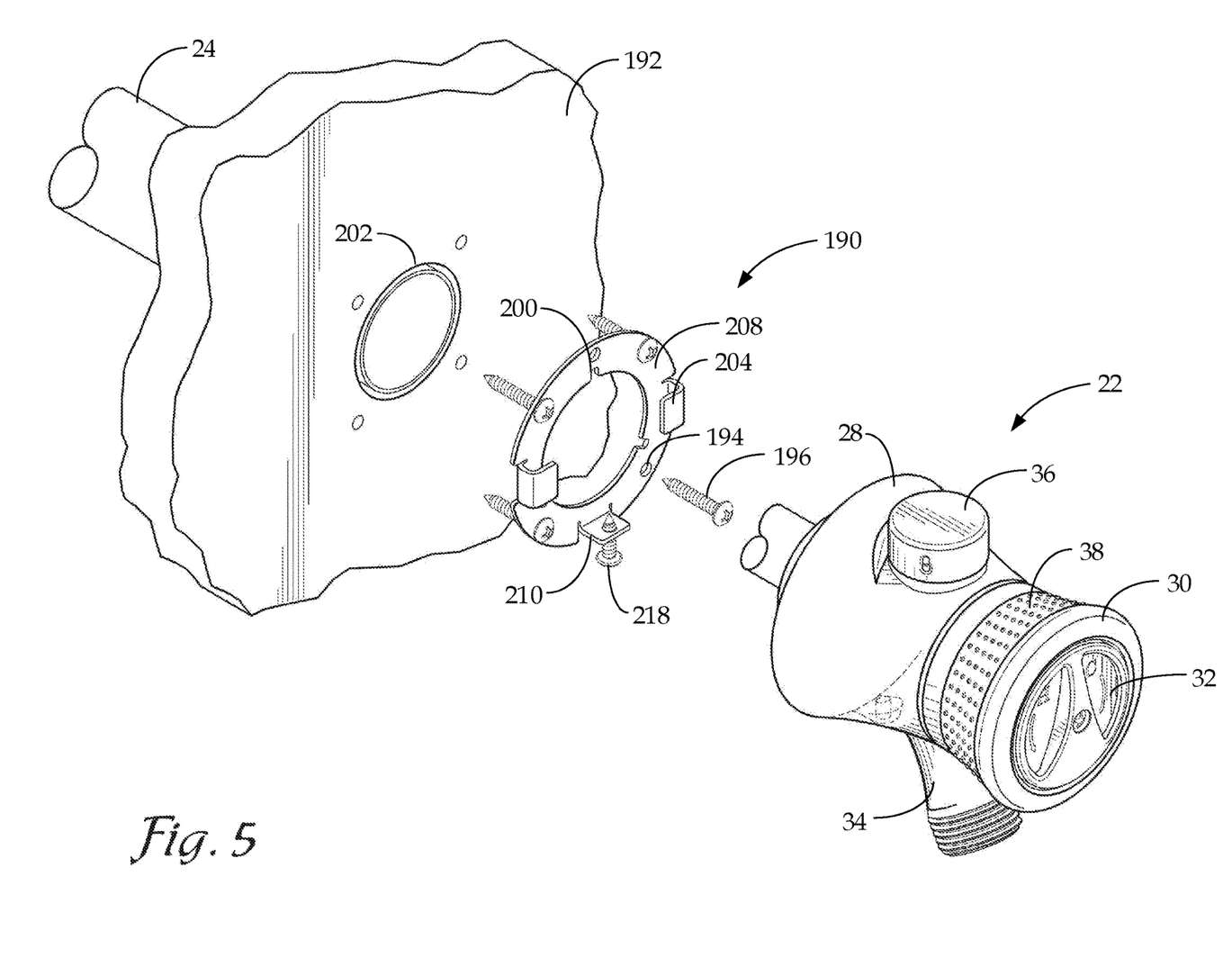
FIG. 5 is a partial exploded view of the mixing hydrant of FIG. 1.
Figures 6, 7:
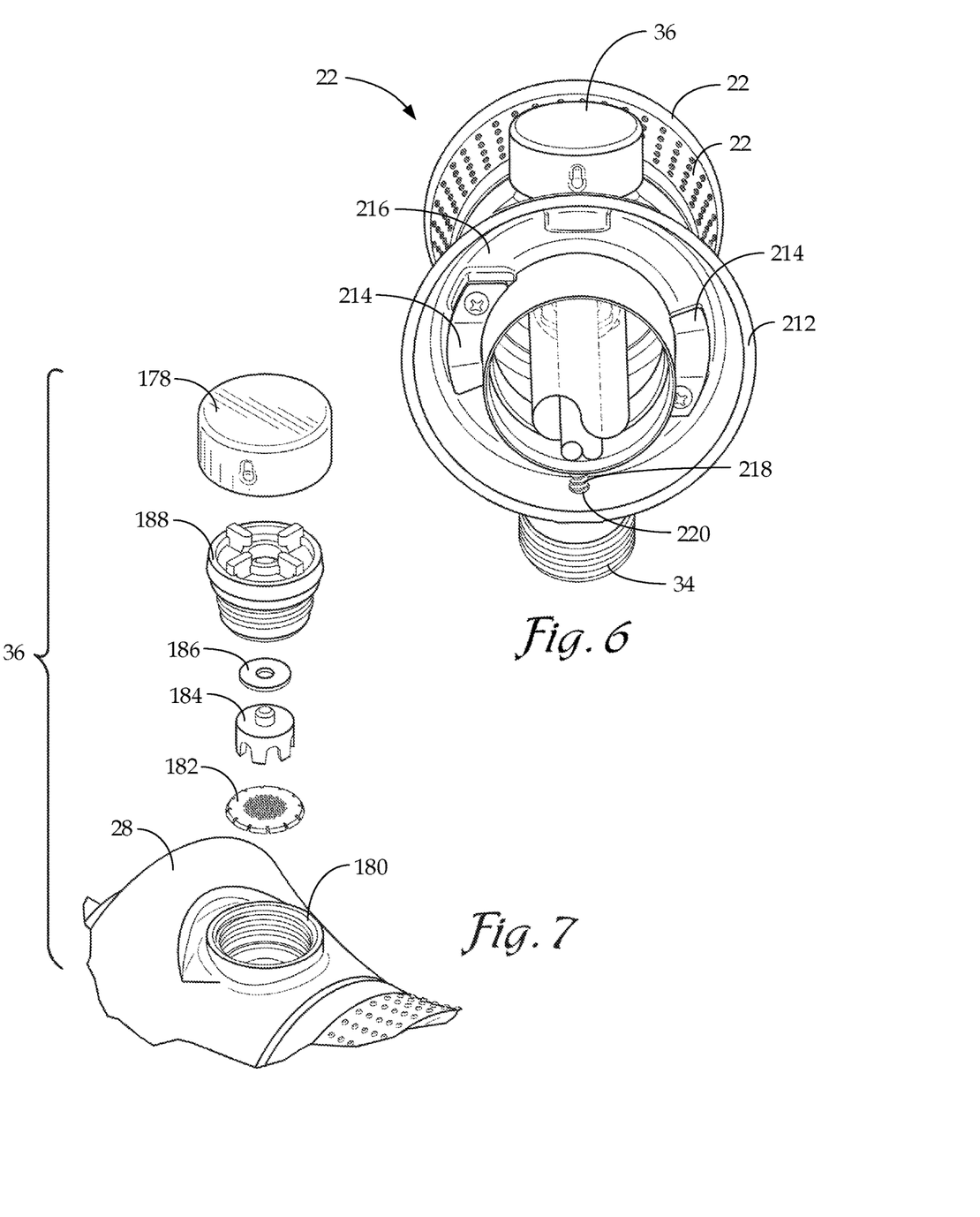
FIG. 6 is an enlarged partial perspective rear view of the head of the mixing valve of FIG. 1.
FIG. 7 is an enlarged partial perspective exploded view of the vacuum breaker of the mixing valve of FIG. 1.
Figure 8:
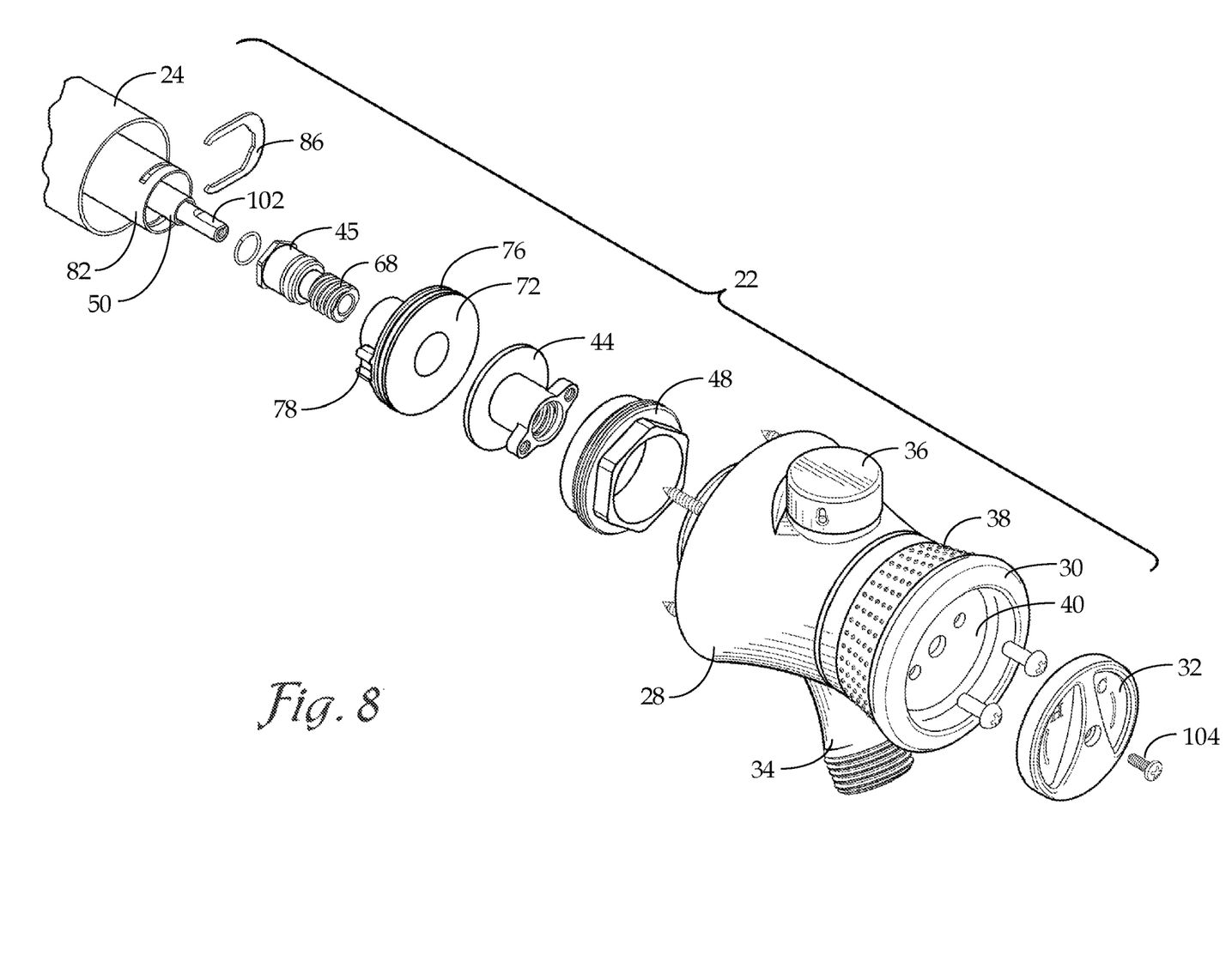
FIG. 8 is a partial exploded perspective view of the mixing valve of FIG. 1.
Figure 9:
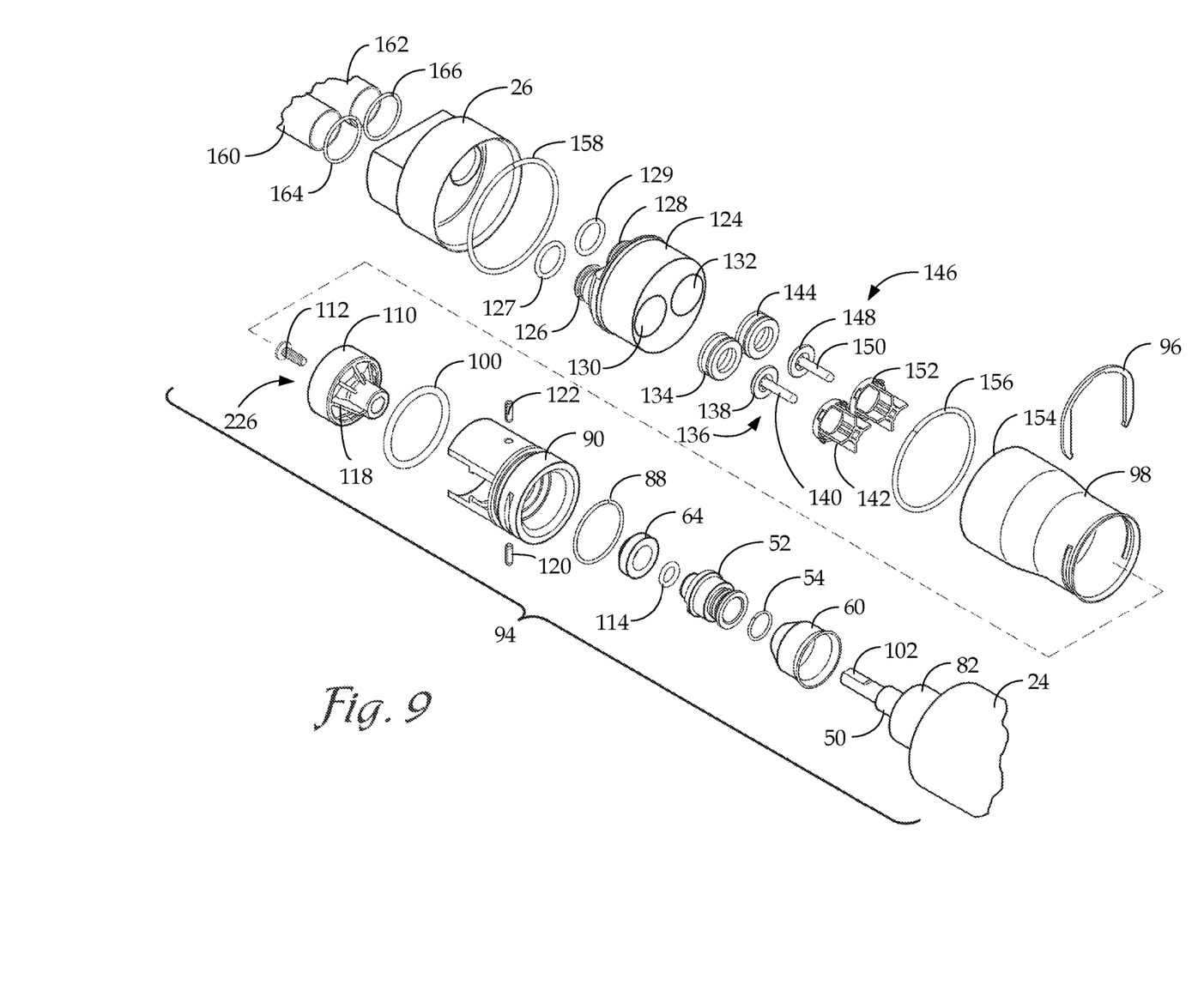
FIG. 9 is a partial exploded perspective view of the mixing valve of FIG. 1.
Figure 10:
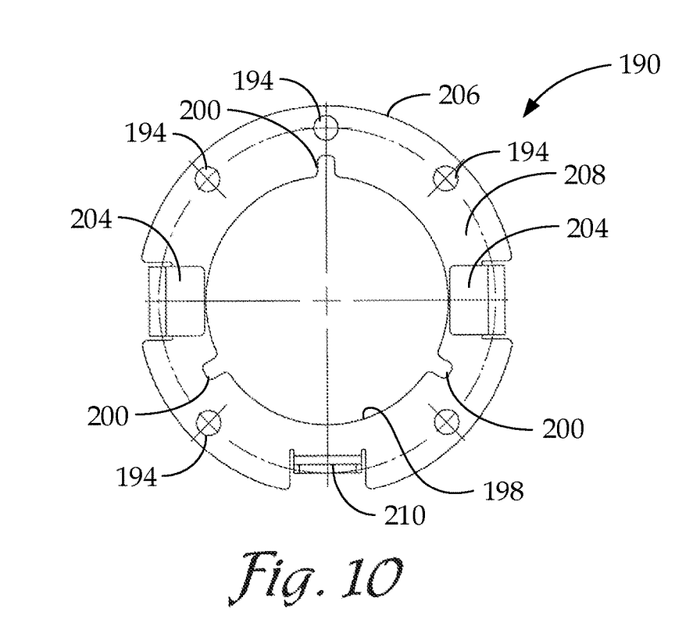
FIG. 10 is a plan view of a head mounting bracket.
Figures 11, 13:
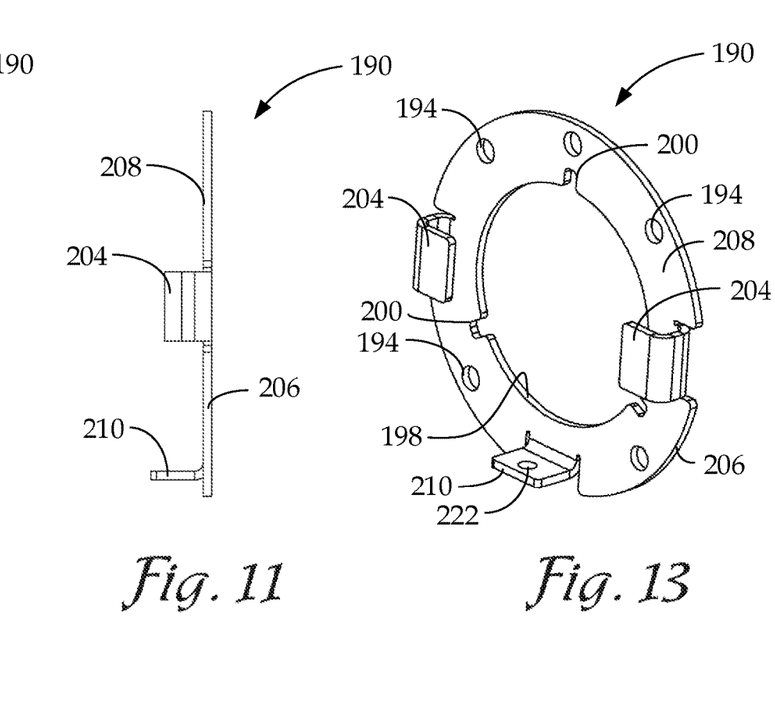
FIG. 11 is a side view of the head mounting bracket of FIG. 10.
FIG. 13 is a perspective view of the head mounting bracket of FIG. 10.
Figure 12:
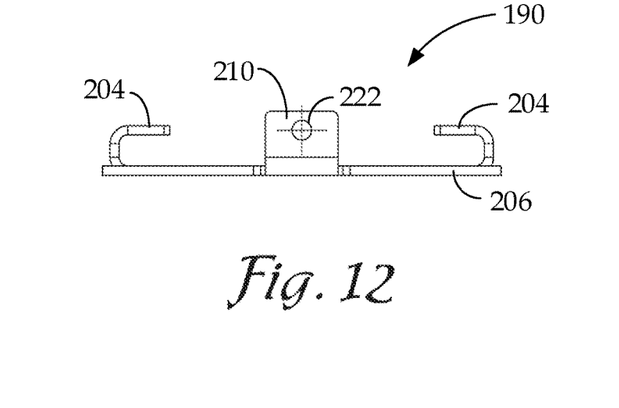
FIG. 12 is a bottom view of the head mounting bracket of FIG. 10.

Various embodiments of the present invention are disclosed herein, it is to be understood that the disclosed embodiments are merely exemplary of the invention, which may be embodied in various forms. Thus, any specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology used in the following description is for convenience in reference only and is not limiting. For example, the words "forwardly", "rearwardly", "upwardly", "downwardly", "upper", or "lower", for example, all refer to a position or relationship of the item to which the reference is made. The words "inwardly" and "outwardly" refer to directions toward and away from, respectively, the geometric center of the embodiment being designated and parts thereof. The terminology used herein may include the words specifically mentioned, derivatives thereof and words of a similar import. It is further understood that terminology such as the aforementioned directional phrases may be used to describe exemplary embodiments of the mixing hydrant as shown in the figures herein.

Referring to the figures, a hydrant of the present invention is generally indicated by reference numeral 20. Hydrant 20 includes a head 22, a tubular valve body 24, and an inlet connection 26. The head 22 includes a body 28, a flow control knob 30, a temperature control knob 32, a spout 34 and a vacuum breaker assembly 36. The flow control knob 30 may include a grip 38 extending circumferentially around the outside perimeter of the flow control knob 30. The temperature control knob 32 is rotatably received in a recess 40 in the front face 42 of the flow control knob 30. The flow control knob 30 is coupled to a flow handle driving nut 44 by a pair of retaining fasteners 46, and is held in the head 22 by a valve stem cap 48. The flow handle driving nut 44 is coupled to a stem drive 45, which is coupled to a hollow flow control stem 50 coupled to a stem-end seat 52 opposite the stem drive 45. The stem-end seat 52 may be soldered 54 or otherwise fastened to the end 56 of the hollow flow control stem 50. The stem-end seat 52 may include a collar 58 to retain a rubber backflow preventer 60, and a bibb washer retaining nipple 62 opposite the collar 58. The bibb washer retaining nipple 62 is adapted to receive and retain a seat bibb washer 64 without a screw. The bibb washer retaining nipple 62 may include one or more notches along the periphery to allow the washer 64 to easily be removed/replaced.

The flow handle driving nut 44 includes threads 66 which engage the corresponding threads 68 of the stem drive 45. The stem drive 45 includes a hex-shaped base 70 received in a head seal presser 72 and an O-ring 74 providing a seal between the stem drive 45 and the head seal presser 72. The hex-shaped base 70 prevents rotation of the flow control stem 50 when the flow control knob 30 is rotated to cause the stem drive 45 and flow control stem 50 to translate longitudinally within the hydrant 20. The head seal presser 72 includes an O-ring 76 providing a seal between the head seal presser 72 and the body 28 of the head 22. The head seal presser 72 includes a slotted tab 80 for alignment with a key 78 extending inwardly from the inner surface of the body 28 of the head 22 to ensure proper alignment of the components when assembling and repairing the hydrant 20.

A flow sleeve 82 is coupled at a first end 84 to the head seal presser 72 by a retaining clip 86. The flow sleeve 82 may be soldered 88 or otherwise sealed at a second end 89 to a seat 90, which provides a sealing face/surface 92 for seat bibb washer 64. The flow sleeve 84 is secured to a valve temperature regulator assembly 94 by a retaining clip 96 and sealed to a housing 98 of the valve cartridge assembly 94 by an O-ring 100.

The temperature control knob 32 is coupled to a temperature control shaft 102 by a temperature control knob retaining fastener 104 at a first end 106 of the temperature control shaft 102 and fits within the hollow flow control stem 50, extending from the head 22 to the seat 90. A second end 108 of the temperature control shaft 102 opposite the first end 106 is coupled to a temperature control wheel 110 by a temperature control shaft retaining fastener 112. The temperature control shaft 102 is sealed to the stem end seat 52 by an O-ring 114. The temperature control shaft 102 extends through the end 62 of the hollow flow control stem 50. The temperature control wheel 110 is rotatably received within a rear open sided chamber 116 of the seat 90. The temperature control wheel 110 includes a rotation-limiting tab 118, which engages slotted spring pins 120 and 122 extending inwardly through opposite sides of the rear open-sided chamber 116 to limit rotation of the temperature control wheel 110 generally +/−90 degrees. However, the range of rotation may be greater or less than +/−90 degrees up to +/−180 degrees, for example.

The valve temperature regulator assembly 94 includes a poppet valve body 124 with a hot-water inlet nipple 126 and a cold-water inlet nipple 128 and associated hot-water poppet valve aperture 130 and cold-water poppet valve aperture 132. The hot-water poppet valve aperture 130 receives a first poppet valve seat 134, a poppet valve 136 with a valve dome 138 and stem 140, and a poppet valve body 142, which retains the poppet valve 136 in the hot-water valve aperture 130. The cold-water poppet valve aperture 132 receives a second poppet valve seat 144, a poppet valve 146 with a valve dome 148 and stem 150, and a poppet valve body 152, which retains the poppet valve 146 in the cold-water valve aperture 132. The poppet valve body 124 fits within the end 154 of the housing 98, and may be soldered 156 or otherwise sealed and fastened to the housing 98.

The tubular valve body 24 may be soldered 158 or otherwise sealed and fastened to the inlet connection 26. A hot inlet tube 160 and a cold inlet tube 162 may be soldered 164 and 166 respectively, to a hot inlet port 168 and a cold inlet port 170, respectively, in the inlet connection 26. The hot inlet tube 160 is in fluidic communication with the hot-water inlet nipple 126 and the cold inlet tube 162 is in fluidic communication with the cold-water inlet nipple 128. The tubular valve body 24 may be soldered 172 or otherwise sealed and fastened to the body 28 of head 22.

The flow sleeve 82 includes at least one aperture 174 and may include another aperture 176, or more apertures as desired, on the bottom side of the flow sleeve 82. The aperture 174 permits water to flow from the interior of the flow sleeve 82 into the tubular valve body 24 and out the spout 34 when the stem-end seat 52 is retracted and the bibb washer 64 is not in contact (sealing) with seat 90, in an open position. When the stem-end seat 52 is fully extended and the bibb washer 64 is in contact with seat 90 in a closed position, water drains from the flow sleeve 82 through apertures 174 and 176 into the valve body 24 and out the spout 34. The aperture 176 is located toward the head 22 so that if the hydrant 20 is installed at an incline as recommended, water will readily drain from the flow sleeve 82 when the bibb washer 64 is in the closed position.

A vacuum breaker assembly 36 is secured within a threaded aperture 180 in the upper surface of the body 28 of the head 22. The vacuum breaker assembly 36 includes a turbulence reducer 182, a vacuum breaker poppet valve 184, a vacuum breaker washer 186, a threaded vacuum breaker poppet valve body 188, and a vacuum breaker cap 178. The vacuum breaker assembly 36 prevents water from being back-siphoned into the potable water system. This prevents contamination of the water system should the water system's pressure drop and create a back-siphonage condition.

Because the hydrant 20 closes inside the structure 192, it automatically self-drains when all attachments such as a hose, are removed from the spout 34, which protects the hydrant 20 from freezing and rupturing in cold weather.

A problem with prior art vacuum breaker assemblies is when the water is on and flowing out of the spout 34, these prior art vacuum breaker assemblies tend to leak. This leakage may be as insignificant as an annoying drip or steady trickle, or more significant causing water damage to the surface below the hydrant. When water is flowing through any hydrant and out the spout, the water flow is turbulent. This turbulence causes the vacuum breaker poppet valve in prior art hydrants to vibrate or chatter and unseat from the vacuum breaker body allowing water to escape from the vacuum breaker assembly.

The vacuum breaker assembly 36 of the present invention eliminates this problem providing a near leak-free design. When water is flowing through the tubular body 24 and out the spout 34, the turbulence is reduced or eliminated from affecting the vacuum breaker poppet valve 184 by the turbulence reducer 182. The turbulence reducer 182 reduces or eliminates the turbulent water flow into the vacuum breaker assembly 36 so that a constant pressure is applied to the vacuum breaker poppet valve 184 and it seals with the vacuum breaker washer 186 against the vacuum breaker poppet valve body 188 to eliminate or reduce water leakage. The turbulence reducer 182 does not affect the performance of the vacuum breaker assembly 36 with respect to back siphonage.

A mounting bracket 190 is provided to mount the hydrant 20 to the side of a structure 192 such as a house. The mounting bracket 190 is generally a circular ring with two or more evenly spaced screw holes 194 for receiving mounting screws 196 to secure the mounting bracket 190 to the structure 192. Along the interior periphery 198 of the mounting bracket 190, one or more alignment notches 200 may be included. The notches 200 may be evenly spaced around the interior periphery 198 to provide a visual aid to the installer in keeping the mounting bracket 190 centered and aligned with the aperture 202 in the structure 192.

The mounting bracket 190 includes a pair of head mounting tabs 204 positioned on opposite sides of the mounting bracket 190. The head mounting tabs 204 are generally C-shaped extending from the outer periphery 206 of the mounting bracket 190 to the inner periphery 198 in a plane in front of and parallel to a plane of the surface 208 of the mounting bracket 190. A head retaining tab 210 extends perpendicularly from the bottom of the mounting bracket 190. With the mounting bracket 190 installed on the structure 192 surrounding the aperture 202, the inlet connection 26 of the hydrant 20 is inserted into the aperture 202 with the head 22 rotated at a 9 or 10 o'clock position until the rear edge 212 of the head 22 is flush with the surface of the structure 192. The head 22 is then rotated to a 12 o'clock position. A pair of retaining clips 214, mounted in a recess 216 in the back of the head 22, engage and are captured by the head mounting tabs 204 when the head 22 is rotated to the 12 o'clock position. A fastener 218 may be inserted through an aperture 220 extending into the recess 216 of the head 22 and engages an aperture 222 in the head retaining tab 210 to lock the head 22 in place. When mounted to the structure 192, the entire mounting bracket 190 and mounting screws 196 are all completely covered by the head 22.

In operation, the temperature control knob 32 may be turned to the left or the right to set the valve 20 to a desired temperature. The temperature control knob 32 rotates the temperature control shaft 102, which is coupled to the temperature control wheel 110. The temperature control wheel 110 includes a cammed surface 224 within a channel 226 against which the stems 140 and 150 of poppet valves 136 and 146 respective, are urged by the inlet water pressure. The depth of the channel 226 ranges from a minimum depth of 228 at which the corresponding poppet valve 136 or 146 is closed, to a maximum depth of 230 at which the corresponding poppet valve 136 or 146 is fully open. The cammed surface 224 may be angled or inclined within the channel 226 from a first depth to a second depth.

When the flow control knob 32 is rotated counterclockwise, the threads 66 of the flow handle driving nut 44 engage the corresponding threads of the stem drive 45 to longitudinally translate the follow control stem 50 and unseat the seat bibb washer 64 from the sealing face/surface 92 to open the hydrant 20. The water flows around the seat bibb washer 64 into the flow sleeve 82, around the backflow preventer 60, and through the aperture 174 into the valve body 24. The water flows along the inside of the valve body 24 and exits the spout 34. The flow rate of the water may be controlled by adjusting the flow control knob 30 clockwise or counterclockwise. The temperature of the water may be adjusted as desired by turning the temperature control knob 32 clockwise or counterclockwise. Once a desired temperature is set, the hydrant 20 may be opened and closed repeatedly by rotating the flow control knob 30 without readjusting the temperature control knob 32.

When the flow control knob 30 is turned fully clockwise, the seat bibb washer 64 is fully seated against the sealing face/surface 92 turning off the hydrant 20 and the flow of water. Any water remaining in the flow sleeve 82 may drain through the apertures 174 and 176 into the valve body 24 and out the spout 34.

If there is a drop in pressure in the water system creating a back-siphonage condition, the back-flow preventer 60 seals against the inside circumferential surface of the flow sleeve 82 to prevent water from flowing back into the structure and contaminating the water supply. Additionally, the poppet valves 136 and 146 are forced into closed positions in a back-siphonage condition presenting a further back-flow prevention. Furthermore, the vacuum breaker assembly 36 prevents water from being back-siphoned into the potable water system preventing contamination of the water system should the water system's pressure drop and create a back-siphonage condition While certain forms and embodiments of the vehicle carton and method for forming the same have been illustrated and described herein, the present invention is not to be limited to the specific forms or arrangement of parts described and shown, and that the various features described may be combined in ways other than those specifically described without departing from the scope of the present invention.

Having thus described the invention, what is claimed as new and desired to be secured by Letters Patent is as follows:

1. A mixing hydrant comprising:
   a head, a valve body, a valve temperature regulator assembly, and hot and cold water inlets;
   said head having a flow control knob, a temperature control knob, and a spout;
   said valve temperature regulator assembly having a housing, a poppet valve body received in said housing, said poppet valve body having a hot water inlet nipple coupled to said hot water inlet, a cold water inlet nipple coupled to said cold water inlet, a hot water poppet valve aperture adapted to receive a hot water poppet valve, and a cold water poppet valve aperture adapted to receive a cold water poppet valve;
   a temperature control wheel in communication with said hot water poppet valve and said cold water poppet valve, and coupled to said temperature control knob; and
   a flow control stem having a first end coupled to said flow control knob, and a second end coupled to a seat bibb washer adapted to alternately engage a seat in a closed position and release from said seat in an open position;
   said valve body having a flow sleeve coupled to said valve temperature regulator assembly housing and said valve body surrounding and in fluidic communication with said flow sleeve and said spout;

wherein rotation of said temperature control knob rotates said temperature control wheel to selectively permit movement of said hot water poppet valve and said cold water poppet valve between a closed position and an open position;

wherein in rotation of said flow control knob translates said flow control stem longitudinally to selectively move said seat bibb washer from said closed position to said open position.

2. The mixing hydrant of claim 1 wherein said flow control knob includes a front face and a recess in said front face.

3. The mixing hydrant of claim 2 wherein said temperature control knob is received in said recess in said front face of said flow control knob.

4. The mixing hydrant of claim 1 wherein rotation of said flow control knob is independent of rotation of said temperature control knob.

5. The mixing hydrant of claim 1 wherein said wherein said flow sleeve includes an aperture proximate said valve temperature regulator assembly housing.

6. The mixing hydrant of claim 5 wherein said flow sleeve includes a second aperture proximate said head.

7. The mixing hydrant of claim 1 further comprising a backflow preventer arranged proximate said seat and adapted to seal against an inner circumferential surface of said flow sleeve in a back-flow condition.

8. The mixing hydrant of claim 1 wherein said temperature control wheel includes a rotation-limiting tab to limit rotation of said temperature control knob from a first position to a second position.

9. The mixing hydrant of claim 8 wherein when said temperature control knob is in said first position said hot water poppet valve is open and said cold water poppet valve is closed.

10. The mixing hydrant of claim 8 wherein when said temperature control knob is in said second position said hot water poppet valve is closed and said cold water poppet valve is open.

11. The mixing hydrant of claim 8 wherein said temperature control knob is selectively adjustable from said first position to said second position.

12. The mixing hydrant of claim 1 wherein further comprising a vacuum breaker assembly in communication with said spout.

13. The mixing hydrant of claim 1 wherein said temperature control wheel includes a cammed surface in communication with said hot water poppet valve and said cold water poppet valve and transitioning from a first depth to a second depth corresponding to said closed position and said open position.

14. A mixing hydrant comprising:
a head having a flow control knob, a temperature control knob, and a spout;
a valve body coupled to said head,
a valve temperature regulator assembly having a housing, a poppet valve body received in said housing, and a valve sealing surface;
said poppet valve body having a hot water inlet nipple coupled to a hot water inlet, a cold water inlet nipple coupled to a cold water inlet, a hot water poppet valve aperture adapted to receive a hot water poppet valve, and a cold water poppet valve aperture adapted to receive a cold water poppet valve;
a temperature control wheel having a cammed surface in communication with said hot water poppet valve and said cold water poppet valve, and coupled to said temperature control knob; and
a flow control stem having a first end coupled to said flow control knob, and a second end coupled to a seat bibb washer adapted to alternately engage said valve sealing surface in a closed position and release from said valve sealing surface in an open position;
said valve body having a flow sleeve coupled to said housing of said valve temperature regulator assembly opposite said head and said valve body surrounding and in fluidic communication with said flow sleeve and said spout;
wherein rotation of said temperature control knob rotates said temperature control wheel to selectively allow movement of said hot water poppet valve and said cold water poppet valve between closed positions and open positions;
wherein in rotation of said flow control knob translates said flow control stem longitudinally to selectively move said seat bibb washer from said closed position in contact with said valve sealing surface to said open position away from said valve sealing surface.

15. The mixing hydrant of claim 14 wherein said temperature control wheel includes a rotation-limiting tab to limit rotation of said temperature control knob from a first position to a second position.

16. The mixing hydrant of claim 15 wherein when said temperature control knob is in said first position said hot water poppet valve is open and said cold water poppet valve is closed.

17. The mixing hydrant of claim 15 wherein when said temperature control knob is in said second position said hot water poppet valve is closed and said cold water poppet valve is open.

18. The mixing hydrant of claim 15 wherein said temperature control knob is selectively adjustable from said first position to said second position.

19. The mixing hydrant of claim 14 wherein said flow control knob includes a front face and a recess in said front face.

20. The mixing hydrant of claim 19 wherein said temperature control knob is received in said recess in said front face of said flow control knob.

21. The mixing hydrant of claim 14 wherein rotation of said flow control knob is independent of rotation of said temperature control knob.

22. The mixing hydrant of claim 14 wherein further comprising a vacuum breaker assembly in communication with said spout.

* * * * *